United States Patent
Kobayashi et al.

[11] Patent Number: 5,922,097
[45] Date of Patent: Jul. 13, 1999

[54] WATER ENHANCED FINING PROCESS A METHOD TO REDUCE TOXIC EMISSIONS FROM GLASS MELTING FURNACES

[75] Inventors: Hisashi Kobayashi, Putnam Valley, N.Y.; Rudolf Gerardus Catherina Beerkens, Swalmen, Netherlands

[73] Assignee: Praxair Technology, Inc., Danbury, Conn.

[21] Appl. No.: 08/871,322

[22] Filed: Jun. 9, 1997

Related U.S. Application Data

[63] Continuation-in-part of application No. 08/662,834, Jun. 12, 1996, abandoned.

[51] Int. Cl.⁶ .............................. C03B 5/16; C03B 5/18; C03B 5/225
[52] U.S. Cl. .................. 65/134.1; 65/134.3; 65/134.4; 65/134.5; 65/134.9
[58] Field of Search ............................... 65/134.1, 134.3, 65/134.4, 134.5, 134.6, 134.8, 134.9, 157; 501/84

[56] References Cited

U.S. PATENT DOCUMENTS

| | | | |
|---|---|---|---|
| 2,331,052 | 10/1943 | Shadduck | 49/77 |
| 3,606,825 | 9/1971 | Johnson | 65/136 |
| 3,960,532 | 6/1976 | Lazet | 65/22 |
| 4,545,800 | 10/1985 | Won et al. | 65/134 |
| 4,738,938 | 4/1988 | Kunkle et al. | 501/72 |
| 4,919,700 | 4/1990 | Pecoraro et al. | 65/134 |
| 5,509,951 | 4/1996 | Baucke et al. | 65/134.6 |
| 5,665,137 | 9/1997 | Huang | 65/134.1 |

OTHER PUBLICATIONS

"What Role Does Batch Sulfate Play in the Production of Float Gas"; W.Blaine Gibbs; *Glass Industry*/Dec. 1994, pp. 14–22.

"Advances in the Fusion and Processing of Glass"; International Conference, Oct. 22–25, 1990, Düsseldorf; *International Journal of Glass Science and Technology*.

"Is Your Glass Full of Water?"; John T. Brown, Hisashi Kobayashi; *Corning*; this paper was presented at the 56th Annual Conference on Glass Problems at University of Illinois i Urbana–Champaign, Oct. 23–25, 1995.

"Mathematical Models Of Bubbles Growth And Dissolution in Glass Meets", F. Kramer, *Gas Bubbles In Glass—International Commission on Glass*.

*Primary Examiner*—Peter Chin
*Assistant Examiner*—Jacqueline A. Ruller
*Attorney, Agent, or Firm*—Robert J. Follett

[57] ABSTRACT

A method of glass formation which provides for reduced levels of toxic emissions is disclosed wherein conventional batch fining agents such as $Na_2SO_4$, $As_2O_5$ or $Sb_2O_5$ are used in lesser amounts in combination with dissolved water in the glass making process. Sources of water in the process include alkali-metal hydroxides, steam bubbled into the molten glass, submerged combustion of the glassmelt with $H_2$ and $O_2$, the use of hydrocarbon based combustion. Glass quality is not compromised.

14 Claims, 6 Drawing Sheets

WATER ENHANCED FINING PROCESS A METHOD TO REDUCE TOXIC EMISSIONS FROM GLASS MELTING FURNACES

This is a Continuation-in-Part of prior U.S. application Ser. No. 08/662,834, filed Jun. 12, 1996, now abandoned.

FIELD OF THE INVENTION

This invention relates to a method of reducing toxic emissions from glass melting furnaces.

BACKGROUND OF THE INVENTION

In the production of glass a generalized process is followed wherein glass forming materials such as sand, soda, lime, feldspar, dolomite and recycled glass (commonly referred to as cullet) are mixed into a batch which is melted and fined in a furnace operating at atmospheric pressure and at temperatures of about 800–1300° C. and of about 1300–1500° C., respectively. The glass material is then cooled for conditioning, forming and annealing. (See Tooley, The Handbook of Glass Manufacture, 3d. Ed.)

During the melting phase, gases such as $CO_2$ and $N_2$ are formed due to various well known reactions. These gases form bubbles or imperfections in the melt which must be eliminated. Fining is the physical and chemical process by which these gases are removed from the glassmelt. As part of this process, various materials known as fining agents are added to the batch glass prior to mixing. The primary role of these agents is to release gases in the glassmelt at proper fining temperatures which then diffuse into gas bubbles in the glassmelt. As the bubbles become larger their relative buoyancy increases and they rise to the surface of the glassmelt where the gases are released. According to Stokes' law, the speed at which the. bubbles move through the glassmelt may be increased by reducing the viscosity of the glassmelt. By increasing glassmelt temperature, more fining gases are released and the viscosity of the glassmelt is reduced. This is why the fining process takes place in the hottest zone in the furnace.

Since a conventional glass melting furnace operates at atmospheric pressure above the glassmelt, the fining process of gas bubbles inside the glassmelt takes place at about 1 to 2 atmospheres depending on the depth of the glassmelt as well as any additional pressure caused by the surface tension effect on small bubbles. (Beerkens, R. G. C., Glastechnische Berichte Vol. 63, 1990, pp. 222–236). Rapid release of fining gases can take place when the glassmelt temperature is increased, the fining agent is dissociated and the partial pressure of fining gases exceeds the internal pressure of gas bubbles. Thus, an effective fining agent for atmospheric pressure glass melting and fining processes must have a property such that as the temperature of the glassmelt is increased to the temperature range where the viscosity of the glassmelt is sufficiently low, i.e., 1300 to 1500 C. for soda lime glass, a large amount of fining gases is released. Gases such as $O_2$, $N_2$, $CO_2$, $H_2O$ and argon, whose solubilities in glassmelt depend only weakly with temperature, have not been considered as effective fining agents, either alone or in combination with other known fining agents in an atmospheric pressure glass melting and fining process.

An example of a common fining agent is sodium sulfate, which dissociates to form $SO_2$ and $O_2$ gases according to the following reaction:

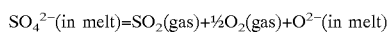

$$SO_4^{2-}(\text{in melt}) = SO_2(\text{gas}) + \tfrac{1}{2}O_2(\text{gas}) + O^{2-}(\text{in melt})$$

Other sulfate compounds include calcium sulfate and barium sulfate, as well as sulfate containing materials such as filter dust and slags are also used in the batch materials to provide sulfate in glass.

The amount of sulfate used in glass batch depends on the type of glass melted. Typical ranges of sodium sulfate used per metric ton of glass product are 6 to 12 kg (3.4 to 6.7 kg as $SO_3$) for float and oxidized plate glass, 5 to 8 kg (2.8 to 4.5 kg as $SO_3$) for flint bottle glass, 4 to 7 kg (2.2 to 3.9 kg as $SO_3$) for green bottle glass, and 5 to 10 kg for textile fiber glass (E-glass). When a large fraction of the charge materials consists of cullet, the requirement for sodium sulfate may be reduced below the ranges shown above since cullet already contains sulfate.

About half of sulfate in the glass batch may be retained in the glass product and the other half evolves as $SO_2$ gas during fining and batch melting. $SO_2$ gas evolves during batch melting by reacting with carbon and other compounds, including reducing gases in the furnace atmosphere, if present.

$SO_2$ as well as other toxic and particulate emissions from glass furnaces are of serious environmental concern. One possible solution to this problem is the use of oxy-fuel combustion, which uses commercial grade oxygen in place of air. While oxy-fuel combustion has been demonstrated to reduce $NO_x$ emissions from gas furnaces by 80 to 99%, methods to reduce other toxic and particulate emissions are still being sought. A major source of these emissions is fining agent reaction products such as $SO_2$ which are released during the melting and fining processes.

It is also known that gaseous $SO_2$ plays a role in the formation of particulate emissions in the following manner. NaOH which has formed at the glassmelt surface, by the reaction of water vapor and sodium oxide in glassmelt, reacts with $SO_2$ and $O_2$ in the regenerator and flue duct to form $Na_2SO_4$ as well as other sulfate compounds. These compounds condense to form sub-micron sized particles.

There are currently three primary methods used to reduce $SO_2$ emissions: 1) reduction in the amount of sulfate in a glass batch, 2) controlling the burner firing conditions and atmosphere within the furnace to reduce the loss of sulfate during batch melting, and 3) installation of an $SO_2$ scrubber in order to clean flue gas.

For most commercial glass furnaces the amount of sulfate in the glass batch has been adjusted to a lowest acceptable level to operate the furnace properly and to achieve good glass quality. So a further reduction in sulfate would result in poor glass quality. For example the "theoretical minimum limit of sulfate requirement" for float glass is defined as the amount of sulfate retained in glass plus 0.05 wt. % as $SO_3$ evolved at the fining zone (W. R. Gibbs and W. Turner, "Sulfate Utilization in Float Glass Production", 54th Conference in Glass Problems, The Ohio State University, November 1994). Therefore, assuming 0.25 wt. % $SO_3$ retention in glass, the minimum sulfate requirement is equivalent to 5.3 kg of sodium sulfate per metric ton of float glass. The actual amount of sulfate mixed in the batch materials is typically much greater.

It is known that impinging flames and reducing combustion atmospheres tend to accelerate batch sulfate reactions and result in premature release of $SO_2$ in the batch melting zone. Thus, an adjustment of the burner firing conditions and the furnace atmosphere over the batch area may reduce sulfate emissions without adversely affecting the glass quality.

For glass furnaces equipped with a bag house or an electrostatic precipitator, greater particulates generation may not create a problem. For these furnaces, greater volatilization of sodium in the furnace by high velocity burners or by higher operating temperatures may reduce $SO_2$ vapor emissions by forming more $Na_2SO_4$ particulates. This is not a preferred option, however, as higher sodium volatilization could create refractory corrosion problems. Likewise, installation of an $SO_2$ scrubber is not preferred as this incurs additional costs. Thus, the most preferred option to decrease $SO_2$ emissions in atmospheric pressure glass melting and fining processes is to reduce batch sulfate, provided that glass fining is not adversely effected.

In the vacuum refining method of glass (Kunkle et al., U.S. Pat. No. 4,738,938 and Pecoraro et al., U.S. Pat. No. 4,919,700) molten glass is transferred in a refining vessel and removal of gas bubbles is accelerated by reducing the pressure in the vessel. Contrary to an atmospheric pressure glass melting and fining process it is preferable to create a sufficiently large volume of foam for effective removal of dissolved gases. In such a system it is not necessary to use a common fining agent such as sodium sulfate that releases gases with increasing glassmelt temperature.

In FIG. 1, the solubility of $SO_3$ and $H_2O$ are plotted against pressure, assuming gas solubility of 0.1 and 0.108 wt. % respectively, at 1500 C. The solubility $SO_3$ is known to decrease proportionally with the partial pressure of $SO_3$, while the solubility of $H_2O$ is known to decrease proportionally to the square root of the partial pressure of $H_2O$. For example, if the glassmelt contains 0.4 wt. % $SO_3$ and the pressure is reduced to about 0.4 atm, $SO_3$ will start to evolve. Similarly, if the glassmelt contains 0.04 wt. % $H_2O$ and the pressure is reduced to about 0.14 atm, $H_2O$ will start to evolve. All dissolved gases will start to come out of the glassmelt as the pressure of the glassmelt is reduced below the saturation points of the dissolved gases. Thus, in a vacuum process, any gas with sufficient solubility in glass can be used to expand gas bubbles and create foam for refining, and a fining agent such as $SO_3$ is not required.

The role of fining agents and dissolved gases in an atmospheric process, which relies upon an increase in glassmelt temperature for refining, is known to be fundamentally different. In FIG. 2, the solubility of $SO_3$ and $H_2O$ are plotted against temperature at atmospheric pressure. As the temperature of the glassmelt increases, the solubility of $SO_3$ decreases sharply and reaches about 0.3 wt. % at 1400 C. for float glass. If this glass initially contains 0.3 wt % of $SO_3$ (which exists as $SO_4^{2-}$ in the glassmelt), then $SO_3$ would start to evolve at about 1400 C. as the temperature of the melt is increased. (See Gibbs and Turner cited above). By comparison, the solubility of $H_2O$ is insensitive to temperature, or even increases slightly with temperature according to some data (F. Kramer, in "Gas Bubbles in Glass", International Commission on Glass, 1985, p. 105, Table II, Ref [10].)

Thus, even if glass is saturated with water at low temperature, $H_2O$ would not be expected to evolve as the temperature of glass is increased. As such, gases such as $O_2$ and $H_2O$ whose solubilities in glassmelt are substantially lower than $SO_3$ and further, whose solubilities depend only weakly with temperature, have not been considered as effective fining agents in an atmospheric pressure glass melting and fining process.

Another significant difference between vacuum and atmospheric glassmaking processes is that in an atmospheric process the formation of foam in the fining zone must be minimized as it reduces the heat transfer from the flames and furnace crown to the glassmelt and as such reduces the glassmelt temperature required for fining. Although the vacuum refining process can substantially eliminate the need for conventional fining agents, the high costs of such a system make it uneconomic to use in the commercial glass making processes except for the manufacture of a few special glasses.

Accordingly, it is an object of this invention to provide an atmospheric pressure glass melting and refining process which allows for the reduction in batch sulfate as well as other known fining agents required without adversely effecting the quality of the glass produced.

It is known that water acts as an effective fluxing agent in glassmaking operations by forming hydroxyl groups in the glass molecular structure. A number of methods to increase the quantity of hydroxyl groups in glass have been tried. For example, steam or moist air has been bubbled through molten glass in an electrically heated glass melting furnace (E. N. Boulos et al, in "Water in Glass: A Review", J. Canadian Ceramic Soc. Volume 41, 1972); heating with hydrogen based combustion has been carried out, either above the glass surface or by submerged combustion (K. J. Won et al, in U.S. Pat. No. 4,545,800); and alkali hydroxyl compounds such as sodium hydroxide, potassium hydroxide and lithium hydroxide have been added to the glass batch during melting (Doi et al in "Uniform Introduction of OH Group into $Li_2O$—$Al_2O_3$—$SiO_2$ Glass By Addition of $LiOH.H_2O$", Japan J. Appl. Phys. Vol 12, 1973). Finally, under oxy-fuel firing, the concentration of water dissolved as OH groups in glass becomes 30% higher as compared to air combustion (Kobayashi and Brown "Is Your Glass Full of Water?" 56th Ann. Conf. on Glass Problems at the University of Illinois (Urbana-Champaign) October, 1995).

However, it has not heretofore been recognized or disclosed that there is a relationship between water content and the atmospheric pressure fining process such that one may effectively reduce the amount of conventional fining agent required to remove a given amount of undissolved gases from a glassmelt.

SUMMARY OF THE INVENTION

The invention comprises a method of glass formation which provides for reduced levels of toxic emissions, wherein conventional batch fining agents are used in combination with dissolved water in an atmospheric glass making process.

In a preferred embodiment, the batch fining agent is selected from the group consisting of sulfate compounds, arsenic oxides, antimony oxides and sodium chloride.

In another preferred embodiment, the batch fining agent is selected from the group consisting of arsenic oxides, antimony oxides and sodium chloride.

In another preferred embodiment a source of the dissolved water is at least one of metal hydroxides, submerged combustion of the glassmelt with $H_2$ and $O_2$; heating the glassmelt via oxygen combustion of hydrogen or a hydrocarbon either above the glass surface or by submerged combustion and bubbling steam into the glassmelt.

In another preferred embodiment, the glass making furnace is either an oxy-fuel fired furnace or an air fired furnace.

Another aspect of the invention is glass compositions which are obtained through the above processes.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
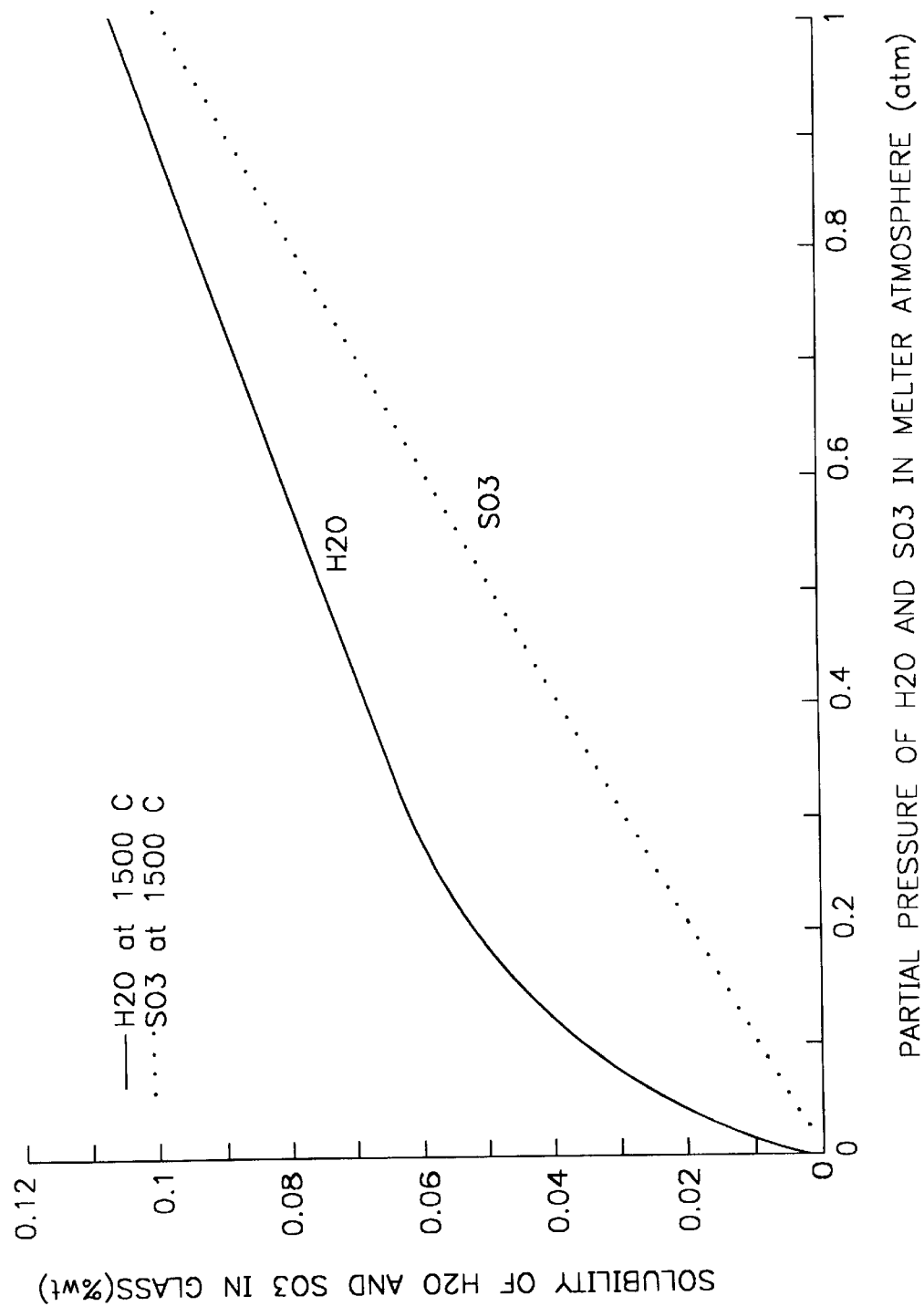
FIG. 1 is a graph of $SO_3$ and $H_2O$ solubility in glassmelt versus pressure.
Figure 2:
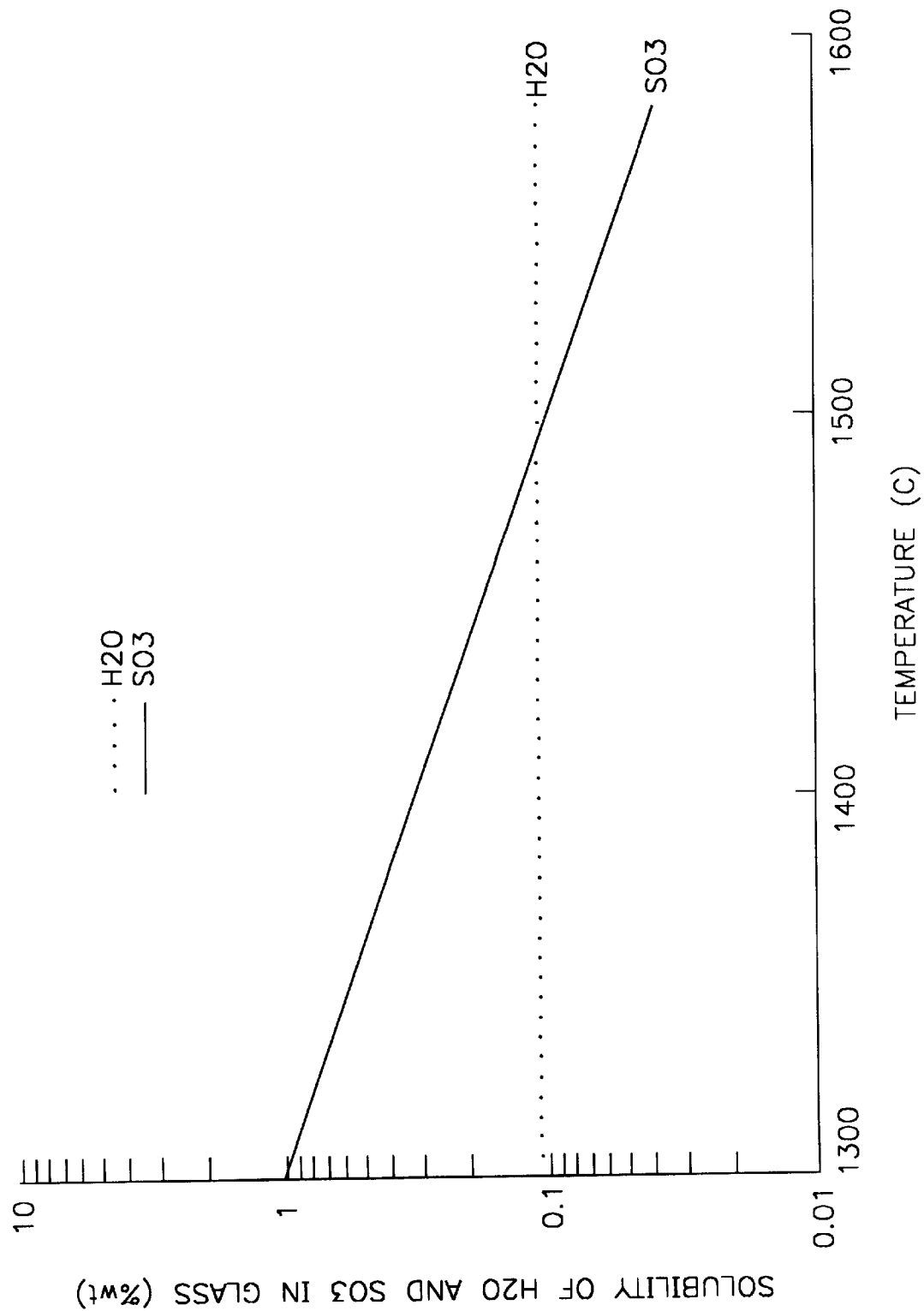
FIG. 2 is a graph of $SO_3$ and $H_2O$ solubility in glassmelt versus temperature.

We have found for the purposes of the present invention, that there is a relationship between the amount of water dissolved in the glassmelt and the amount of conventional fining agents required to remove a given quantity of undissolved gas. Thus one may reduce toxic emissions via what may be expressed as a partial substitution or replacement of conventional fining agents with water that has been dissolved into the glassmelt as hydroxyl groups.

The invention may be accomplished by an atmospheric glassmaking process wherein a first amount of fining agent effective to remove a quantity of undissolved gases from a glassmelt formed from a batch of glass forming materials is determined; a second, lesser amount of said fining agent is added to said batch; the batch is heated to form a glassmelt, and fined to remove all or substantially all of said quantity of undissolved gases. In this process dissolved water is added in an amount, when combined with said second amount of fining agent, effective to remove all or substantially all of said quantity of undissolved gases from said glassmelt and cooling said glassmelt.

The invention was derived through the following analytical model and demonstrated in laboratory tests.

In the bubble growth model of fining, diffusion of dissolved gases into small bubbles increases the bubble size and accelerates bubble ascension to the glass surface. If one assumes the same initial conditions with respect to the number, size and type of gas bubbles in glassmelt, one may also assume that by keeping the total volume of gases that would be diffused into the bubbles constant, one would achieve the approximately same degree of glass fining, regardless of which gases are diffused.

In light of the above, the volume of $SO_2$ required for fining can be potentially reduced, if (a) fewer impurity bubbles are formed initially, (b) other gases replace $SO_2$, or (c) glass viscosity is reduced by a higher peak fining temperature and/or by higher OH concentration. We have determined that the replacement of $SO_2$ with $H_2O$ is a preferred option.

Water has a very high solubility in glass (about 150 gram mole per $m^3$ of glass or about 1080 wt.ppm at 1 atm for common soda-lime-silicate glasses.) and is non-toxic when emitted into the atmosphere. Other common gases such as $CO_2$ and $N_2$ have one to three orders of magnitude lower molar solubilities than that of $H_2O$ and as such could not replace fining gases significantly.

The approximate amount of sulfate replaced with additional dissolved water can be estimated by assuming a constant gas volume. One mole of sulfate results in 1.5 moles of fining gas according to the chemical equation set forth above. Thus, 1.5 moles of dissolved $H_2O$ (in addition to the $H_2O$ already present in glassmelt: typically 35–50 mol/$m^3$ in an air-fuel fired glass furnace) would replace one mole of sulfate. On a weight basis it corresponds to a replacement ratio of $2.9_{SO3}:1_{water}$. For example, 0.01 wt. % as $SO_3$ in glass is replaced with 0.0034 wt. % (34 wt. ppm) of dissolved $H_2O$.

Actual replacement ratios of $SO_3$ with dissolved $H_2O$ are expected to be much greater for several reasons. The rate of bubble growth is dependent on the diffusion rates of fining gases and water has a much higher diffusivity compared to $SO_2$. Water vapor in the bubble reduces the partial pressure of other gases and thus, increases the rate of diffusion of other gases into the bubble. When a bubble grows faster, it ascends faster due to the greater buoyancy effect. The viscosity of glassmelt is significantly reduced with higher water content, which also accelerates the fining process. As will be described later, the retention of sulfate in glass is also reduced with higher water content. Thus, the corresponding reduction of sulfate in batch must be take into consideration.

It is recommended to replace sulfate with water at a mole ratio, measured as mol/$m^3$ $SO_3$ divided by $H_2O$ mol/$m^3$, of preferably 0.25:1 to 10:1, more preferably 0.5:1 to 5:1 and most preferably 0.5:1 to 2:1. Common commercial soda-lime-silicate glasses have a composition, expressed in weight %, of $SiO_2$: 71 to 74%, $Na_2O$ plus $K_2O$: 12 to 15%, CaO plus MgO: 12 to 14%, $Al_2O_3$: 0.1 to 3.0%, and other minor constituents or impurities such as selenium and iron. For these glasses, the following ranges of sulfate and dissolved water are recommended, assuming that the dissolved water in glassmelt prior to fining in the current practice is 35 to 50 mol/$m^3$. The amount of dissolved water is increased by 20 to 100 mol/$m^3$ and the amount of sulfate is reduced by 10 to 100 mol/$m^3$ (0.3 to 3.0 kg as $SO_3$ per metric ton of glass).

More specifically, for a float glass comprised of a composition, expressed in weight %, of $SiO_2$: 71 to 74%, $Na_2O$ plus $K_2O$: 12 to 15%, CaO plus MgO: 12 to 14% and $Al_2O_3$: 0.05 to 6.0%, the amount of sulfate as $SO_3$ should be greater than 0.08 to 0.2 wt. %, preferably 0.10 to 0.20 wt. % and the amount of water should be 0.04 to 0.1 wt. % (400 to 1000 wt.ppm) of water. This may be produced with 1.6 to 3.0 kg of sulfate as $SO_3$ per metric ton of glass.

For a flint bottle glass or oxidized plate glass comprised of a composition, expressed in weight %, of SiO2 : 71 to 74%, $Na_2O$ plus $K_2O$: 12 to 15%, CaO plus MgO: 10 to 14% and $Al_2O_3$: 0.7 to 3%, the amount of sulfate as $SO_3$ should be greater than 0.08 to 0.2 wt. %, preferably 0.10 to 0.20 wt. % and the amount of water should be 0.04 to 0.1 wt. % (400 to 1000 wt.ppm). This may be produced with 1.6 to 3.0 kg of sulfate as $SO_3$ per metric ton of glass.

For a mildly oxidized (green bottle) glass comprised of a composition, expressed in weight %, of $SiO_2$: 71 to 74%, $Na_2O$ plus $K_2O$: 12 to 15%, CaO plus MgO: 10 to 14% and $Al_2O_3$: 1.0 to 3%, the amount of sulfate as $SO_3$ should be greater than 0.02 to 0.1 wt. %, preferably 0.05–0.09 wt. % and the amount of water should be 0.04 to 0.1 wt. % (400 to 1000 wt.ppm). This may be produced with 0.3 to 2.0 kg of sulfate as $SO_3$ per metric ton of glass. It should be noted, that by the term "mildly oxidized" we mean a glass, such as a green bottle glass, which has been oxidized to a lesser extent than float or flint glasses.

For a textile fiber glass comprised of a composition, expressed in weight %, of $SiO_2$: 52 to 57%, $Na_2O$ plus $K_2O$: less than 1%, CaO plus MgO: 20 to 26%, $Al_2O_3$: 13 to 17%, $B_2O_3$: 4 to 8%, the amount of sulfate as $SO_3$ should be 0.01 to 0.03%, preferably 0.01 to 0.02 wt. % and the amount of water should be 0.06 to 0.1 wt. % (600 to 1000 wt.ppm). This may be produced with 1 to 5 kg of sulfate as $SO_3$ per metric ton of glass. Other sulfate compounds such as calcium sulfate and barium sulfate may be used to partially replace sodium sulfate.

By way of comparison, at present typical float and flint soda-lime-silicate glasses are produced in atmospheric air fired furnaces from 3.0 to 6.0 kg of sulfate as $SO_3$ per metric ton of glass and comprise between 250–350 wt.ppm water and more than 0.20 wt. % as $SO_3$.

For arsenic and antimony fined glasses one mole of $As_2O_5$ or $Sb_2O_5$ would generate one mole of $O_2$ as the fining gas, which could be replaced with one mole of additional $H_2O$ dissolved. Similarly one mole of NaCl could be replaced with one mole of additional $H_2O$. The actual replacement ratios of these fining agents with water are expected to be greater for the reasons discussed before. Thus, it is preferable to replace 0.2 to 10 moles of arsenic, antimony or sodium chloride in batch, more preferably 0.4 to 5 moles of arsenic, antimony or sodium chloride in batch, with one mole of additional dissolved water in glassmelt.

As shown above, the product glass manufactured by the method of this invention will contain a reduced concentration of fining product and an increased water content.

We conducted the following experiments and computer simulations to determine the effects of $SO_2$ replacement with water upon bubble growth. These are shown in the attached Tables and Figures. These examples are presented for illustrative or comparative purposes and are not intended to be limiting.

Experimantal Results

Glass batch test samples were prepared from raw materials such as sand, soda, lime, feldspar, dolomite and sodium sulfate typically used in the glass industry. About 90 to 100 grams of batch materials were used for each laboratory melt. Table 1 summarizes calculated compositions of typical test samples in wt. %. The accuracy of calculated values for major components are within ±0.3 wt. %.

TABLE 1

| | |
|---|---|
| $SiO_2$ | 72.3 wt. % |
| $Na_2O$ | 14.0 |
| CaO | 10.5 |
| MgO | 1.4 |
| $Al_2O_3$ | 1.5 |
| $SO_3$ | 0.3 to 0.6 (varied) |
| $K_2O$ | 0.2 |
| $Fe_2O_3$ | 0.03 |

These batch compositions are representative of oxidized glasses used for the production of flint bottle glasses, tablewares and float glass. Batch materials were well mixed in an alumina crucible and placed in an electrically heated laboratory furnace. Within 50 minutes the furnace was heated up to 1250° C. to form molten glass. After reaching this temperature, a gas mixture was introduced to the furnace and the same mixture was bubbled through the melt for 30 minutes. This furnace atmosphere was synthesized by bubbling a nitrogen/oxygen gas mixture (98 vol. % $N_2$ and 2 vol. % $O_2$) through a water bath maintained at a constant temperature so as to saturate it with water vapor. The moisture content of the atmosphere was varied by selecting different water bath temperatures.

The glassmelt was then heated up to 1450° C. within 20 minutes and kept at the temperature for an additional 20 minutes for fining. These short melting and fining times were chosen so as to allow for observation of differences in the presence of bubbles. Table 2 shows $SO_3$ contents and vol. % water vapor in the furnace atmosphere used for three test cases.

TABLE 2

| Test | $SO_3$ in batch (wt. % in glass) | $H_2O$ in atmosphere (vol. %) |
|---|---|---|
| A. | 0.63 | 1–2 |
| B. | 0.55 | 20 |
| C. | 0.37 | 60 |

The glass samples were analyzed for sulfate and water contents after each test. The results are shown in Table 3.

TABLE 3

| Test | $SO_3$ in glass (wt. %) | $SO_3$ released (wt. %**) | $H_2O$ in glass (ppm) |
|---|---|---|---|
| A. | 0.40 | 0.23 | 155 |
| B. | 0.38 | 0.17 | 338 |
| C. | 0.29 | 0.08 | 617 |

**calculated by difference (i.e. $SO_3$ added to batch minus $SO_3$ in glass)

The quality of glass produced was judged by 7 people for three common defects known as bubbles (or seeds), grains (or stones) and cords, in a scale of 1 to 7 using 2 mm thick polished glass sections cut from the test samples. The presence of bubbles is most critical. The average scores and standard deviation are presented in Table 4.

TABLE 4

| Test | Bubbles | Grains | Cords |
|---|---|---|---|
| A. | 4.4 +/− 1.3 | 5.0 +/− 1.2 | 5.7 +/− 1.1 |
| B. | 3.1 +/− 1.2 | 2.6 +/− 0.8 | 5.0 +/− 0.8 |
| C. | 2.6 +/− 1.3 | 1.7 +/− 0.8 | 5.7 +/− 2.9 |

Score 1 = highest quality, 7 = poorest quality

In spite of the lower sulfate content used in Test C the overall glass quality of sample C was demonstrated to be better than those of samples A and B. Table 3 shows that $SO_3$ released during glass fining was significantly lower for Test C. By comparing tests A and C the overall replacement ratio of sulfate in batch was (0.630–0.370)/(0.0617–0.0155)=5.6 wt. % $SO_3$ per wt. % dissolved water or 1.27 mol of sulfate per mole of water. The sulfate retention in glass was reduced from 0.40 to 0.29 wt. %. Although not tested, we believe that glass having the same quality as obtained in sample B may be attained with even further reduction of sulfate.

Table 5 shows the effects of dissolved water concentration and sulfate concentration on bubble growth time, which was calculated using a mathematical model for bubble growth. This is graphically represented in FIG. 3, wherein the Y axis shows the time (in seconds) for a 200 micron initial diameter air bubble to rise from a glass depth of one meter to the free glass surface. This is a good indicator of fining efficiency, as the faster the bubble rises to the surface, the better the fining process.

TABLE 5

Time (sec) for a 200 micron diameter air bubble to rise from a glass depth of one meter to the glass surface.

| Water Content | $SO_3$ concentration (wt. %) | | | |
|---|---|---|---|---|
| $(mol/m^3)$ | 0.20 | 0.25 | 0.30 | 0.4 |
| 50 | bubble dissolves | 37000 | 12857 | 6660 |
| 70 | 90000 | 12758 | 8185 | 4940 |
| 80 | — | 9461 | 6517 | 4181 |
| 90 | 11650 | 7025 | 5157 | 3500 |
| 100 | 7833 | — | — | — |

Figure 3:
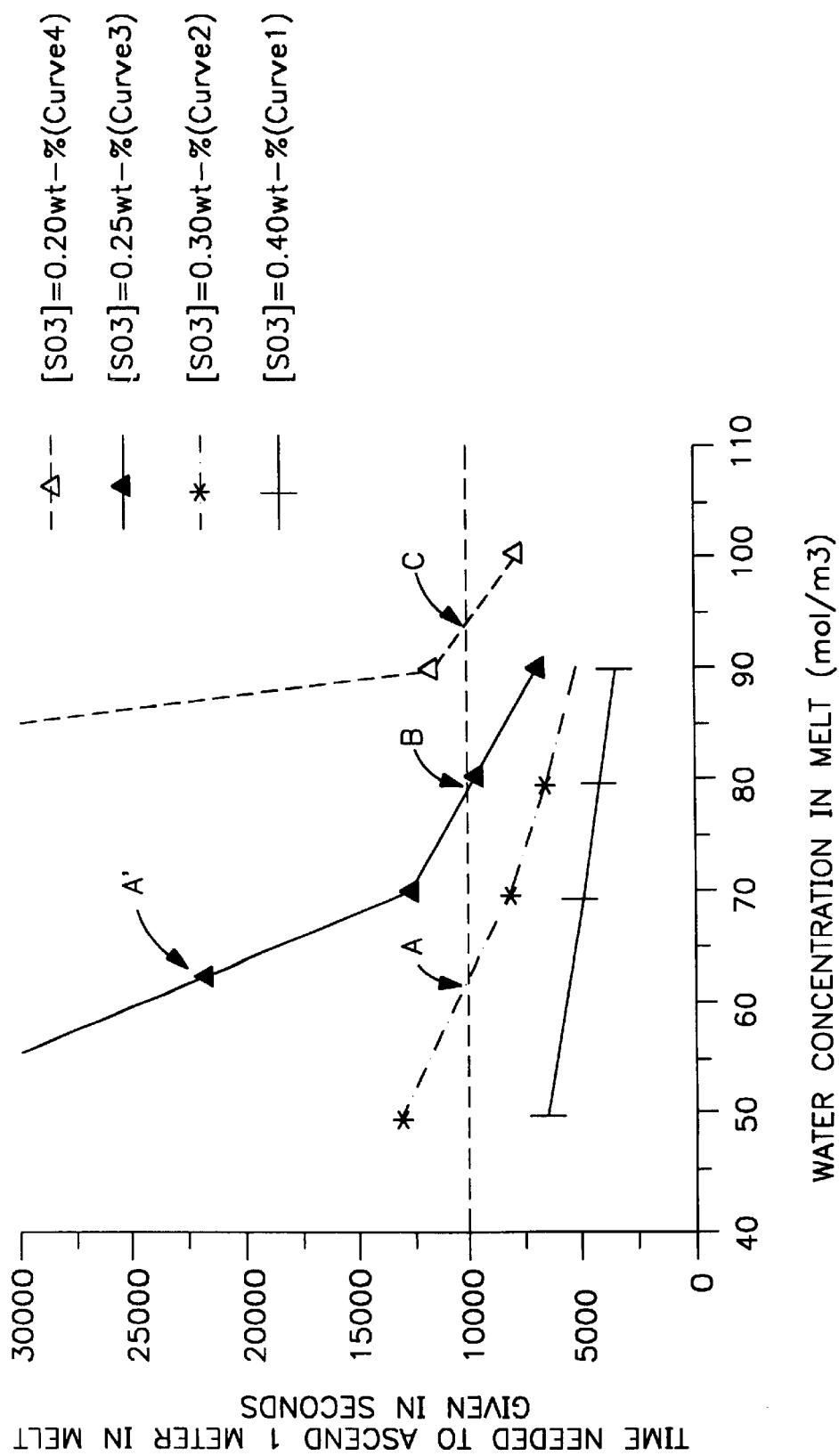
FIG. 3 is a graph which shows the results of a model which predicts the effects of water concentration and sulfate concentration on bubble rise time.

In FIG. 3, Point A (curve 2) shows that the fining time (bubble growth time) is about 10,000 seconds, or 2.78 hours, when the sulfate and dissolved water concentrations in glassmelt are 0.30 wt. % as $SO_3$ and 62 gm·mol/$m^3$ respectively, and the fining temperature is 1475° C. This is a baseline condition.

When the water concentration is increased under the same conditions, the fining time is reduced to about 7,300 seconds at 75 gm·mol/$m^3$ water and to 5,157 seconds at 90 gm·mol/$m^3$ water.

Curve 3 shows the effects of sulfate reduction at the same temperature. The fining time is increased to about 22,000 seconds at 62 gm·mol/$m^3$ water, when the amount of sulfate is reduced to 0.25 wt. % as $SO_3$ (point A'). As indicated by the horizontal dotted line, and point B, the fining time is reduced to 10,000 seconds, or to the baseline condition, at about 78 gm·mol/$m^3$ water. This example shows that by increasing the dissolved water content from 62 to 78 gm·mol/$m^3$, the sulfate concentration to achieve the same fining time is reduced from 0.30 wt. % $SO_3$ to 0.25 wt. % $SO_3$. It corresponds to an incremental molar replacement ratio of 1.0 sulfate to 1 water.

Similarly, Curve 4 shows that by further decreasing the sulfate concentration to 0.20 wt. %, the dissolved water content required to achieve the same fining time is increased to about 92 gm·mol/$m^3$ (Point C). It corresponds to an incremental molar replacement ratio of 1.1 sulfate to 1 water.

Table 6 shows the effects of dissolved water concentration and fining temperature on bubble growth time. This is graphically represented in FIG. 4, wherein the Y axis shows the time for a 200 micron diameter air bubble to rise from a glass depth of one meter to the free glass surface.(pO2=equilibrium oxygen pressure of melt as a measure of oxidation state.)

TABLE 6

Time (sec) for a 200 micron diameter air bubble to rise from a glass depth of one meter to the glass surface.

| Water Content | Temperature (° C.) | | |
|---|---|---|---|
| $mole/m^3$ | 1450 | 1475 | 1500 |
| 50 | bubble dissolves | 12857 | 5109 |
| 70 | 21500 | 8185 | 3850 |
| 80 | 17000 | 6517 | 3290 |
| 90 | 11790 | 4076 | 2770 |

In the Figure, Points A (Curve 2) and A' (Curve 1) show that a temperature increase of 25° C. from 1475° C. to 1500° C. at a dissolved water content of 62 gm·mol/$m^3$ reduces the fining time from 10,000 seconds at the baseline to about 4000 seconds.

Curve 3 shows the effects of a 25° C. temperature decreased as compared to Curve 2. Note that the fining time is substantially increased. Again, it is possible to achieve the same fining time as the baseline by increasing the dissolved water content to 95 gm·mol/$m^3$.

Figure 5:
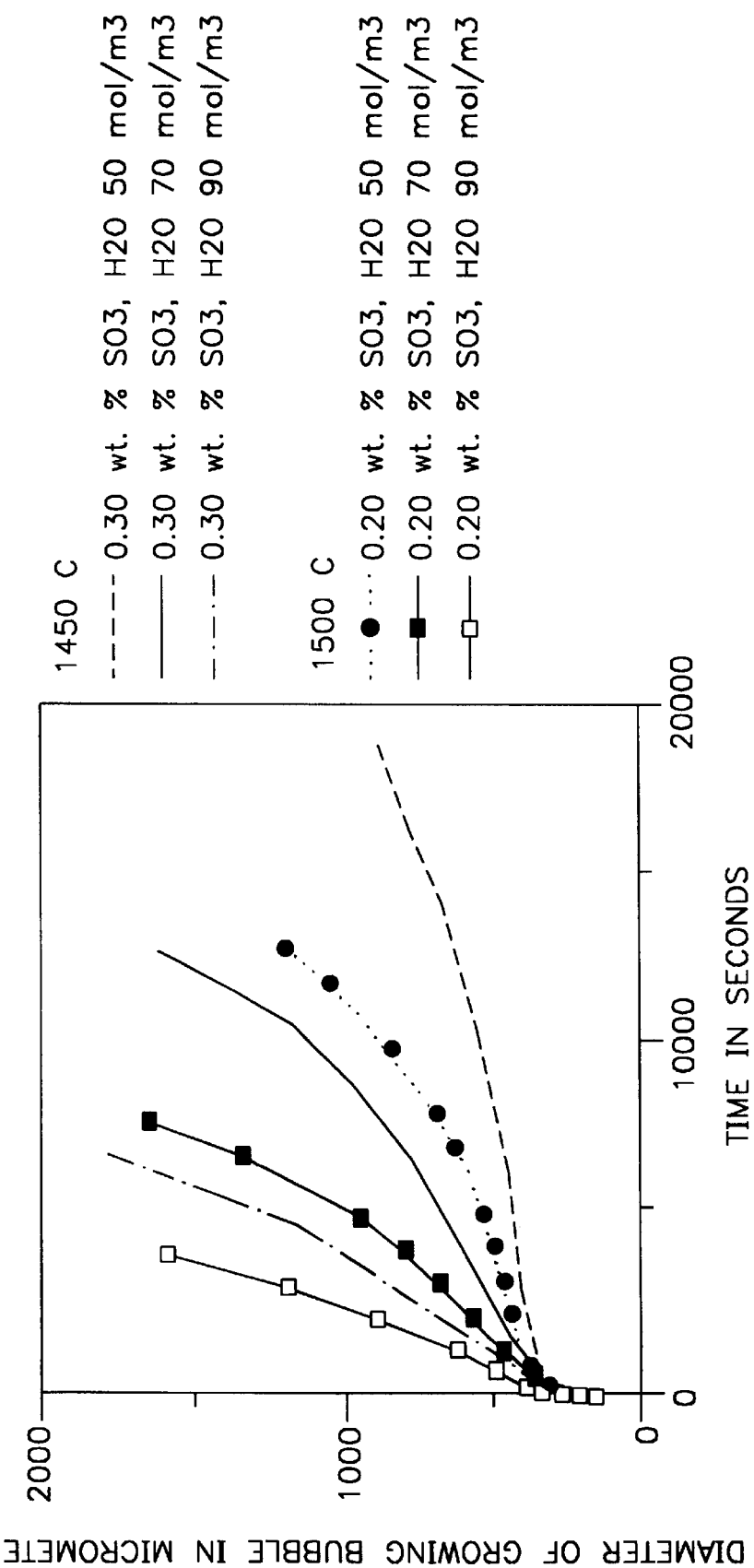
FIG. 5 shows bubble growth in a mildly oxidized glassmelt at 1450° C. and 1500° C. for different sulfate and water concentrations.

Tables 7 and 8 show calculated bubble growth in soda lime glassmelt during sulfate fining in water containing glassmelt at 1450° C. and 1500° C., respectively. These tables are graphically represented in FIG. 5, which shows that an air bubble with an initial 200 micrometer diameter will grow much faster in a melt with higher water content and also at higher temperature.

TABLE 7

(Bubble Diameter (microns) @ 1450° C.)

| | wt. % $SO_3$/[$H_2O$] $(mol/m^3)$ | | |
|---|---|---|---|
| Time (sec) | 0.3/50 | 0.3/70 | 0.3/90 |
| 0 | 200 | 200 | 200 |
| 100 | 265 | 282 | 310 |
| 500 | 317 | 354 | 422 |
| 1000 | 343 | 403 | 517 |
| 2000 | 374 | 474 | 678 |
| 5000 | 432 | 661 | 1210 |
| 7000 | 470 | 805 | 1777 |
| 10000 | 536 | 1096 | escaped |
| 12000 | 591 | 1392 | escaped |
| 15000 | 693 | escaped | escaped |

TABLE 8

(Bubble Diameter (microns) @ 1500° C.)

| | wt. % $SO_3$/[$H_2O$] $(mol/m^3)$ | | |
|---|---|---|---|
| Time (sec) | 0.2/50 | 0.2/70 | 0.2/90 |
| 0 | 200 | 200 | 200 |
| 100 | 284 | 300 | 334 |
| 500 | 343 | 394 | 489 |
| 1000 | 377 | 462 | 630 |
| 2000 | 420 | 574 | 897 |
| 4000 | 495 | 807 | 1595 |
| 5000 | 535 | 948 | escaped |
| 7000 | 631 | 1341 | escaped |
| 10000 | 767 | escaped | escaped |
| 12000 | 1045 | escaped | escaped |
| 15000 | escaped | escaped | escaped |

Figure 4:
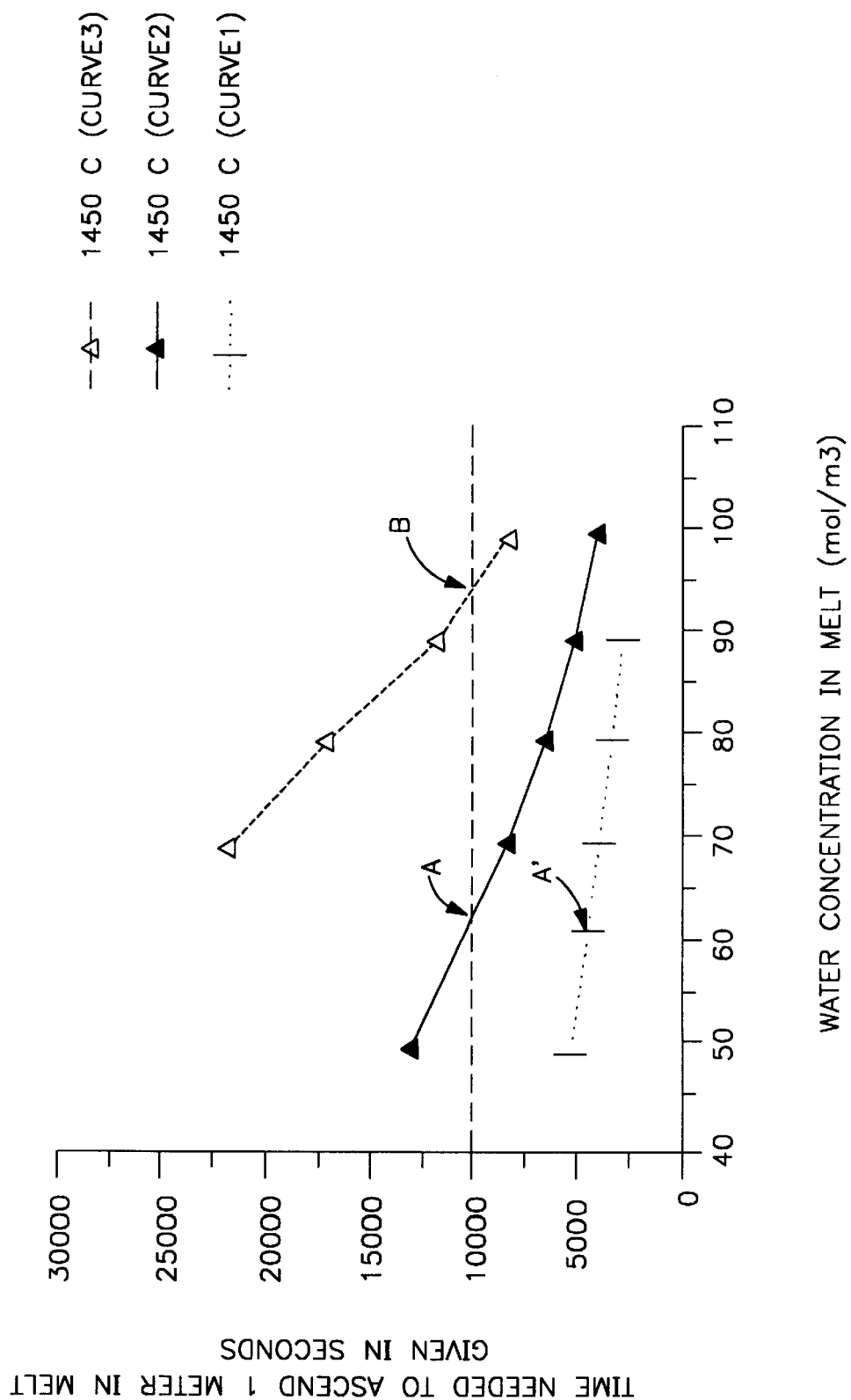
FIG. 4 is a graph which shows the results of a model which predicts the effects of water concentration and sulfate concentration on bubble rise time.

Although it is also possible to reduce the amount of fining agents by increasing the fining temperature, most commercial glass furnaces already operate close to the maximum refractory temperature and further increases in the glass fining temperature is often not practical. On the contrary, reduction of furnace temperature is desirable for many furnaces in order to prolong the furnace life, to reduce volatilization of alkali species, and to reduce particulates and NOx emissions. The present invention offers the benefit of reduction of fining temperature, in place of the reduction of the amount of fining agents. For example FIG. 4 shows that the fining temperature is reduced by about 25° C. by increasing the water content by about 30 mol/$m^3$. It is also possible to achieve combined reduction in fining agent and fining temperature at reduced proportions such that, as interpolated from FIGS. 3 and 4, the fining temperature and $SO_3$ may be reduced by about 12° C. and 0.05 wt. % respectively by increasing the water content by about 30 mol/$m^3$. We believe that a similar relationship is applicable to other glasses such that by substituting a sufficient amount of water for $SO_3$, the fining temperature may be reduced by up to 50° C.

As can be seen from the above, one can replace the amount of initial fining agent with dissolved water and still achieve an effective fining process, a result which has not heretofore been recognized. It is believed that a higher content of dissolved water increases the growth of the gas bubble by diffusion of water into the bubble and that the presence of increased water vapor in the glass bubble has the effect of reducing the partial pressure of other gases in the bubble and accelerating the diffusion of the fining gases ($SO_2$, $O_2$) into the bubble. The net result is a much faster removal of gas bubbles from the glassmelt as can be seen from the above simulations, and the benefit derived from this process is the reduction of toxic emissions due to fining agents.

Figure 6:
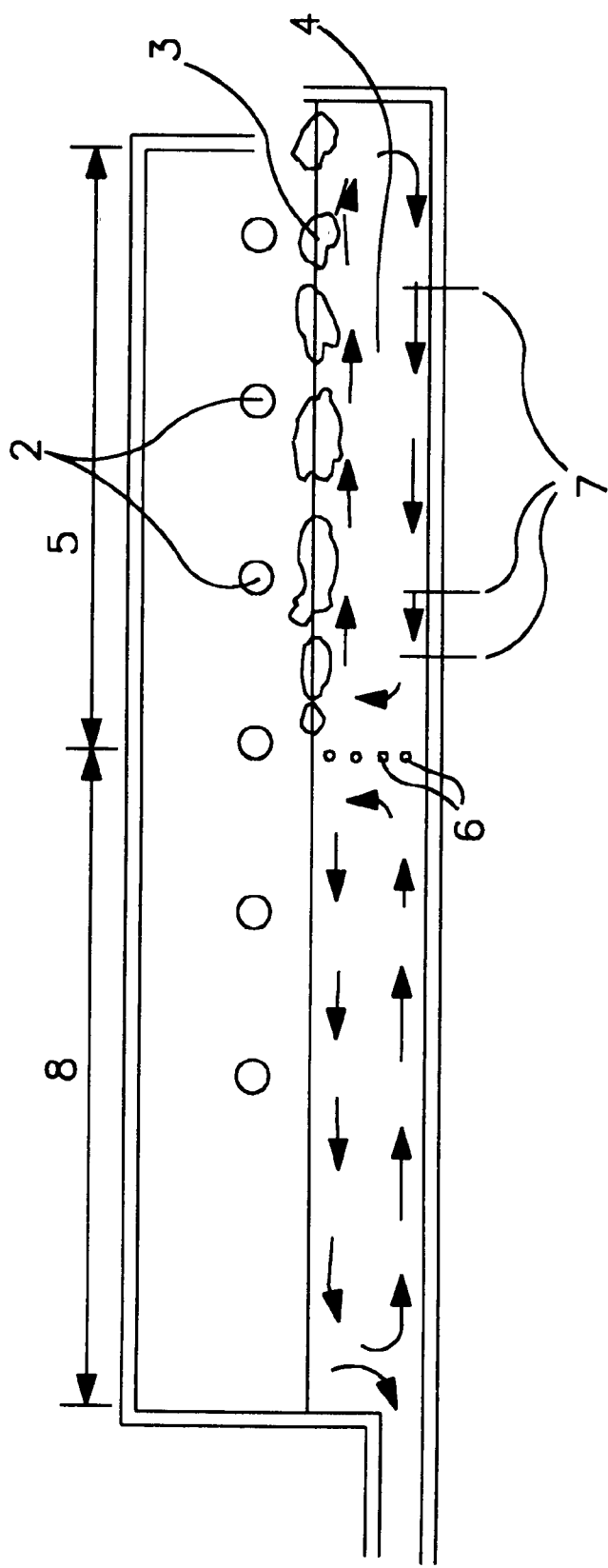
FIG. 6 is a schematic diagram of a cross-sectional side view of a typical atmospheric glass making furnace of the type used in the invention.

Means for achieving the above levels of dissolved water are discussed below. These methods are discussed with reference to FIG. 6 which shows a cross-section of a typical atmospheric pressure glass making furnace 1, having combustion burners 2. The methods include the following:

1) adding at least one metal hydroxide such as LiOH, KOH, Al(OH)$_3$, NaOH, Mg(OH)$_2$ and Ca(OH)$_2$ to the glass batch 3 as hydroxyl group sources;

2) injecting steam or moist gases over the glassmelt 4 in batch melting zone 5, or bubbling steam or moist air through the glassmelt 4 in the batch melting zone 5 of glass melting furnace 1;

3) heating with oxygen based (e.g. oxygen enriched air containing 30 to 100% $O_2$) combustion, especially with hydrogen or a hydrocarbon fuel with a high hydrogen to carbon ratio such as methane, either in the area above the glassmelt 4 or by submerged combustion (beneath the surface of the glassmelt) at least in the melting zone 5 of glass furnace 1; and 4) submerged combustion of the glassmelt with $H_2$ and $O_2$.

When water is dissolved in glassmelt by increasing the partial pressure of water vapor in the furnace atmosphere, it is more effective to create a water rich atmosphere over the batch melting zone 5 and the areas where glassmelt has good convective currents such as surface areas above the gas bubblers 6 and submerged electrodes 7, and active fining areas 8. Note that a typical furnace may have electrodes and/or bubblers.

It is important to dissolve water into glass at or before the fining zone of a glass furnace for water to enhance the fining process. The zone between the batch charging end and the fining area is especially important. It is not critical to this invention to maintain a high water content of glass after the fining reactions have been completed.

The above disclosed invention may be practiced with any effective atmospheric glassmaking furnace arrangement including, but not limited to oxy-fuel or air-fuel furnaces.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for producing glass while reducing toxic emissions from an atmospheric glassmaking furnace, said process comprising:

a) determining a first amount of fining agent effective to remove a quantity of undissolved gases from a glassmelt formed from a batch of glass forming materials;

b) adding a second, lesser amount of said fining agent to said batch;

c) heating said batch to form a glassmelt;

d) fining said glassmelt at substantially atmospheric pressure to remove all or substantially all of said quantity of undissolved gases;

e) adding, prior to or during fining, dissolved water in an amount, when combined with said second amount of fining agent, effective to remove all or substantially all of said quantity of undissolved gases from said glassmelt;

f) cooling said glassmelt.

2. The process according to claim 1, wherein said fining agent is selected from the group consisting of sulfur containing materials, sulfate compounds, arsenic oxides, antimony oxides and sodium chloride.

3. The process according to claim 1, wherein the amount of dissolved water is in an amount sufficient such that the fining temperature is reduced by up to 50° C.

4. The process according to claim 1, wherein said fining agent is one or more sulfate compounds or sulfur containing materials, and a mole ratio range of said fining agent to dissolved water is, measured as mol/m$^3$ $SO_3$:mol/m$^3$ $H_2O$, from 0.25:1 to 10:1.

5. The process according to claim 1, wherein said fining agent is one or more sulfate compounds or sulfur containing materials, and a mole ratio range of said fining agent to dissolved water is, measured as mol/m$^3$ $SO_3$:mol/m$^3$ $H_2O$, from 0.5:1 to 5:1.

6. The process according to claim 1, wherein said fining agent is one or more sulfate compounds or sulfur containing materials and said a mole ratio range of said fining agent to dissolved water is, measured as mol/m$^3$ $SO_3$:mol/m$^3$ $H_2O$, from 0.5:1 to 2:1.

7. The process according to claim 1, wherein said fining agent is selected from the group consisting of arsenic oxides, antimony oxides and sodium chloride, and a mole ratio range of said fining agent to dissolved water is, measured as mol/m$^3$ fining agent:mol/m$^3$ $H_2O$, from 0.2:1 to 10:1.

8. The process according to claim 1, wherein said fining agent is selected from the group consisting of arsenic oxides, antimony oxides and sodium chloride, and a mole ratio range of said fining agent to dissolved water is, measured as mol/m$^3$ fining agent:mol/m$^3$ $H_2O$, from 0.4:1 to 5:1.

9. The process according to claim 1, wherein said dissolved water is in the form of hydroxyl groups, and a source of said hydroxyl groups is at least one metal hydroxide which has been added to said batch of glass forming materials.

10. The process according to claim 1, wherein said batch of glass forming materials is heated to form a glassmelt, and said dissolved water is provided via submerged combustion of said glassmelt with $H_2$ and $O_2$.

11. The process according to claim 1, wherein said batch of glass forming materials is heated to form a glassmelt, and said dissolved water is provided via combustion of said glassmelt with oxygen enriched air containing 30 to 100% $O_2$ and a hydrocarbon.

12. The process according to claim 11, wherein said combustion is submerged combustion.

13. The process according to claim 11, wherein said furnace comprises a batch melting area, a fining area, and either one of an area above a bubbler or above a submerged electrode, and wherein said combustion takes place in at least one of said areas.

14. The process according to claim 1, wherein said glass making furnace is either an oxy-fuel fired furnace or an air fired furnace.

* * * * *